US011136645B2

(12) United States Patent
Zaizen et al.

(10) Patent No.: US 11,136,645 B2
(45) Date of Patent: Oct. 5, 2021

(54) METHOD FOR PRODUCING NON-ORIENTED ELECTRICAL STEEL SHEET, METHOD FOR PRODUCING MOTOR CORE, AND MOTOR CORE

(71) Applicant: JFE STEEL CORPORATION, Tokyo (JP)

(72) Inventors: Yoshiaki Zaizen, Tokyo (JP); Yoshihiko Oda, Tokyo (JP); Tomoyuki Okubo, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 182 days.

(21) Appl. No.: 16/486,121

(22) PCT Filed: Feb. 7, 2018

(86) PCT No.: PCT/JP2018/004135
§ 371 (c)(1),
(2) Date: Aug. 14, 2019

(87) PCT Pub. No.: WO2018/179871
PCT Pub. Date: Oct. 4, 2018

(65) Prior Publication Data
US 2019/0382867 A1 Dec. 19, 2019

(30) Foreign Application Priority Data
Mar. 30, 2017 (JP) .............................. JP2017-067350

(51) Int. Cl.
*C21D 9/46* (2006.01)
*C22C 38/60* (2006.01)
*C22C 38/50* (2006.01)
*C22C 38/48* (2006.01)
*C22C 38/46* (2006.01)
*C22C 38/20* (2006.01)
*C22C 38/06* (2006.01)
*C22C 38/34* (2006.01)
*C22C 38/04* (2006.01)
*C22C 38/00* (2006.01)
*C21D 8/12* (2006.01)
*C21D 8/00* (2006.01)
*C21D 6/00* (2006.01)
*H01F 1/147* (2006.01)
*H02K 1/02* (2006.01)

(52) U.S. Cl.
CPC .............. *C21D 9/46* (2013.01); *C21D 6/004* (2013.01); *C21D 6/005* (2013.01); *C21D 6/008* (2013.01); *C21D 8/005* (2013.01); *C21D 8/12* (2013.01); *C22C 38/001* (2013.01); *C22C 38/002* (2013.01); *C22C 38/008* (2013.01); *C22C 38/04* (2013.01); *C22C 38/06* (2013.01); *C22C 38/20* (2013.01); *C22C 38/34* (2013.01); *C22C 38/46* (2013.01); *C22C 38/48* (2013.01); *C22C 38/50* (2013.01); *C22C 38/60* (2013.01); *H01F 1/147* (2013.01); *H02K 1/02* (2013.01); *C22C 2202/02* (2013.01)

(58) Field of Classification Search
CPC ........ C21D 6/004; C21D 6/005; C21D 6/008; C21D 8/005; C21D 8/0205; C21D 8/12; C21D 8/1222; C21D 8/1227; C21D 8/1233; C21D 8/1261; C21D 8/1272; C21D 8/1283; C21D 9/46; C22C 2202/02; C22C 38/001; C22C 38/002; C22C 38/004; C22C 38/008; C22C 38/02; C22C 38/04; C22C 38/06; C22C 38/08; C22C 38/12; C22C 38/14; C22C 38/16; C22C 38/20; C22C 38/24; C22C 38/26; C22C 38/28; C22C 38/34; C22C 38/46; C22C 38/48; C22C 38/50; C22C 38/60; H01F 1/147; H01F 1/16; H02K 1/02
See application file for complete search history.

(56) References Cited

U.S. PATENT DOCUMENTS

| 2004/0149355 A1 | 8/2004 | Kohno et al. |
| 2014/0113159 A1 | 4/2014 | Fujikura et al. |
| 2014/0366988 A1 | 12/2014 | Dorninger et al. |
| 2017/0260600 A1 | 9/2017 | Okubo et al. |

(Continued)

FOREIGN PATENT DOCUMENTS

| CN | 103498096 A | 1/2014 |
| CN | 103534376 A | 1/2014 |

(Continued)

OTHER PUBLICATIONS

Dec. 11, 2019 Extended Search Report issued in European Patent Application No. 18775032.8.
Tada et al.; "Influence of Magnetic Anisotropy on Hysteresis Loss of Non-oriented Electrical Steel Sheet;" The Iron and Steel Institute of Japan; 2015; pp. 269-273; vol. 101, No. 4.
Nov. 7, 2018 Office Action issued in Taiwanese Patent Application No. 107110617 (with partial translation).

(Continued)

*Primary Examiner* — Jenny R Wu
(74) *Attorney, Agent, or Firm* — Oliff PLC

(57) ABSTRACT

There are provided a method for producing a non-oriented electrical steel sheet, a method for manufacturing a motor core from such a steel sheet, and a motor core. In the production of a non-oriented electrical steel sheet by subjecting a steel slab containing given amounts of C, Si, Mn, P, S, Al, N, Ti, Nb and V, provided that Si, Al and Mn satisfy Si-2Al—Mn≥0, to hot rolling, cold rolling, finish annealing and stress relief annealing, whereby a high-strength rotor core and a stator core having excellent magnetic properties after stress relief annealing can be obtained from the same steel material.

4 Claims, 1 Drawing Sheet

(56) References Cited

U.S. PATENT DOCUMENTS

| | | | |
|---|---|---|---|
| 2018/0030558 A1 | 2/2018 | Okubo et al. | |
| 2018/0066333 A1 | 3/2018 | Nakajima et al. | |

FOREIGN PATENT DOCUMENTS

| | | | |
|---|---|---|---|
| CN | 105256227 A | | 1/2016 |
| JP | 2008-50686 A | | 3/2008 |
| JP | 2011-91936 A | | 5/2011 |
| JP | 2011-179027 A | | 9/2011 |
| JP | 2011179027 A | * | 9/2011 |
| JP | 2016-138316 A | | 8/2016 |
| JP | 2016-151050 A | | 8/2016 |
| JP | 2018-21242 A | | 2/2018 |
| NO | 2016/017263 A1 | | 2/2016 |
| TW | 555863 B | | 10/2003 |
| TW | 201632639 A | | 9/2016 |
| WO | 2016/136095 A1 | | 9/2016 |

OTHER PUBLICATIONS

May 15, 2018 Search Report issued in International Patent Application No. PCT/JP2018/004135.

Nov. 25, 2020 Office Action and Search Report issued in Chinese Patent Application No. 201880022405.1.

Paolinelli et al.; "Effect of stress relief annealing temperature and atmosphere on the magnetic properties of silicon steel;" Journal of Magnetism and Magnetic Materials; 2006; pp. e599-e601; vol. 304, No. 2; (Abstract only).

Xu et al.; "Effects of Residual Stress and Stress Relief Annealing on the Properties of Non-Oriented Electrical Steel;" World Iron & Steel; 2009; pp. 57-61.

Mar. 4, 2020 Office Action issued in Japanese Patent Application No. 2019-508687.

Jan. 29, 2021 Office Action issued in Korean Patent Application No. 10-2019-7026683.

May 31, 2021 Office Action issued in Chinese Patent Application No. 201880022405.1.

* cited by examiner

METHOD FOR PRODUCING NON-ORIENTED ELECTRICAL STEEL SHEET, METHOD FOR PRODUCING MOTOR CORE, AND MOTOR CORE

TECHNICAL FIELD

This invention relates to a method for producing a non-oriented electrical steel sheet, a method for producing a motor core by using such an electrical steel sheet, and a motor core made from the electrical steel sheet.

RELATED ART

An non-oriented electrical steel sheet used in an iron core (motor core) of a rotary machine has been required to have more excellent magnetic properties with an increasing demand for energy saving in recent electric equipment.

A motor core comprises a stator core and a rotor core. The non-oriented electrical steel sheet used in the stator core is strongly demanded to have excellent magnetic properties such as high magnetic flux density and low iron loss in order to satisfy requirements for being small in size and high in output in a recent HEV driving motor or the like.

As means for attaining the small size and high output in the HEV driving motor, there is a tendency of increasing the revolution number of the motor. However, a large centrifugal force is applied to the rotor core because the HEV driving motor is large in the outer diameter or a very narrow portion (1-2 mm) called as a rotor core bridge portion exists depending on the structure thereof. Therefore, the non-oriented electrical steel sheet used in the rotor core is demanded to have a strength higher than that of conventional ones.

To this end, it is ideal that the non-oriented electrical steel sheet used in the motor core is excellent in the magnetic properties and, moreover, has a high strength for the rotor core and a high magnetic flux density and a low iron loss for the stator core. The non-oriented electrical steel sheet used in the same motor core is required to have largely different properties depending on for which core it is used between the rotor core and the stator core. From a viewpoint of increasing a material yield in the manufacture of the motor ore, it is desirable that rotor core materials and stator core materials are simultaneously taken out from the same steel sheet material and thereafter the respective core materials are laminated to assemble the rotor core or the stator core.

As the non-oriented electrical steel sheet having a high strength and excellent magnetic properties, for example, Patent Literature 1 proposes a non-oriented electrical steel sheet having a sheet thickness of not less than 0.15 mm but not more than 0.35 mm, a yield strength before stress relief annealing of not less than 600 MPa, and an iron loss $W_{10/400}$ after stress relief annealing of not more than 20 W/kg, which is used in the construction method that a motor core is produced by laminating a rotor and stator punched out from the same steel sheet and further subjecting only the stator to stress relief annealing.

CITATION LIST

Patent Literature

Patent Literature 1: JP-A-2008-50686

SUMMARY OF INVENTION

Technical Problem

In the technique disclosed in Patent Literature 1, however, impurity elements (Ti, S, N, V, Nb, Zr, As) contained in the steel sheet material are decreased to a very low level to promote crystal grain growth in the stress relief annealing. This technique also has a problem that the production cost is high because Ni, which is high in the material cost, is added or skin pass rolling is conducted before the stress relief annealing to reduce the iron loss.

The invention is made in consideration of the above-mentioned problems inherent to the conventional technique, and an object thereof is to propose a method for producing a non-oriented electrical steel sheet capable of manufacturing a rotor core having a high strength and a stator core having excellent magnetic properties after stress relief annealing from the same raw sheet material, and a method for manufacturing a motor core by using such a non-oriented electrical steel sheet, and to provide a motor core made from such a non-oriented electrical steel sheet.

Solution to Problem

The inventors have focused particularly on an influence of ingredients and a production method upon iron loss $W_{10/400}$ after stress relief annealing and made various studies thereon to solve the above task. As a result, it has been found out that a rotor core having a high strength and a stator core having a low iron loss can be manufactured from the same raw steel sheet material by using a non-oriented electrical steel sheet that is controlled to have Si, Al and Mn in predetermined ranges as the raw steel sheet material and controlling a cooling rate in stress relief annealing of the stator core to not more than 10° C./min, and the invention has been accomplished.

That is, the invention proposes a method for producing a non-oriented electrical steel sheet by subjecting a steel slab having a chemical composition comprising C: not more than 0.0050 mass %, Si: 2.5 to 6.5 mass %, Mn: 0.05 to 2.0 mass %, P: not more than 0.2 mass %, S: not more than 0.005 mass %, Al: not more than 3 mass %, N: not more than 0.005 mass %, Ti: not more than 0.003 mass %, Nb: not more than 0.005 mass %, V: not more than 0.005 mass %, provided that Si, Al and Mn satisfy the following equation (1):

$$Si-2Al-Mn \geq 0 \tag{1}$$

and the residue being Fe and inevitable impurities to hot rolling, cold rolling, finish annealing and stress relief annealing, characterized in that conditions of the finish annealing and stress relief annealing are adjusted such that a yield stress after the finish annealing is not less than 400 MPa, and iron loss $W_{10/400}$ (W/kg) after the stress relief annealing satisfies the following equation (2):

$$W_{10/400} \leq 10+25t \tag{2}$$

in relation to a sheet thickness t (mm), an average value $\lambda_{o\text{-}p}$ (bake) of magnetostriction in a rolling direction and magnetostriction in a direction perpendicular to the rolling direction at 400 Hz and 1.0 T after the stress relief annealing is not more than 5.0×10$^{-6}$, and a ratio ($\lambda_{o-p}$ (bake)/$\lambda_{o-p}$ (green)) of the above average value $\lambda_{o-p}$ (bake) of magnetostriction after the stress relief annealing to an average value $\lambda_{o-p}$ (green) of magnetostriction in the rolling direction and magnetostriction in the direction perpendicular to the rolling direction at 400 Hz and 1.0 T before the stress relief annealing is less than 0.8.

The production method of the non-oriented electrical steel sheet according to the invention is characterized in that the stress relief annealing is conducted such that a soaking temperature is 780 to 950° C. and a cooling rate from the soaking temperature to 650° C. is not more than 10° C./min.

The steel slab used in the production method of a non-oriented electrical steel sheet according to the invention is characterized by containing at least one group selected from the following groups A-D in addition to the above chemical composition:

Group A: one or two selected from Mo and W in an amount of 0.0020 to 0.10 mass % in total,
Group B: one or two selected from Sn: 0.005 to 0.20 mass % and Sb: 0.005 to 0.20 mass %,
Group C: one or two selected from Ca and Mg in an amount of 0.001 to 0.010 mass % in total, and
Group D: one or more selected from Cu: 0.01 to 0.2 mass %, Ni: 0.05 to 1 mass % and Cr: 0.01 to 0.5 mass %.

The invention also proposes a method for manufacturing a motor core by simultaneously taking out rotor core materials and stator core materials from a non-oriented electrical steel sheet having a chemical composition comprising C: not more than 0.0050 mass %, Si: 2.5 to 6.5 mass %, Mn: 0.05 to 2.0 mass %, P: not more than 0.2 mass %, S: not more than 0.005 mass %, Al: not more than 3 mass %, N: not more than 0.005 mass %, Ti: not more than 0.003 mass %, Nb: not more than 0.005 mass %, V: not more than 0.005 mass %, provided that Si, Al and Mn satisfy the following equation (1):

$$Si-2Al-Mn \geq 0 \tag{1}$$

and the residue being Fe and inevitable impurities and a yield stress of not less than 400 MPa, laminating the rotor core materials to form a rotor core, laminating the stator core materials, and subjecting them to stress relief annealing to form a stator core,
characterized in that conditions of the finish annealing and stress relief annealing are adjusted such that iron loss $W_{10/400}$ (W/kg) of the stator core after the stress relief annealing satisfies the following equation (2):

$$W_{10/400} \leq 10+25t \tag{2}$$

in relation to a sheet thickness t (mm),
an average value $\lambda_{o-p}$ (bake) of magnetostriction in a rolling direction and magnetostriction in a direction perpendicular to the rolling direction at 400 Hz and 1.0 T after the stress relief annealing is not more than 5.0×10$^{-6}$, and
a ratio ($\lambda_{o-p}$ (bake)/$\lambda_{o-p}$ (green)) of the above average value $\lambda_{o-p}$ (bake) of magnetostriction after the stress relief annealing to an average value $\lambda_{o-p}$ (green) of magnetostriction in the rolling direction and magnetostriction in the direction perpendicular to the rolling direction at 400 Hz and 1.0 T before the stress relief annealing is less than 0.8.

The manufacture method of the motor core according to the invention is characterized in that the stress relief annealing is conducted such that a soaking temperature is 780 to 950° C. and a cooling rate from the soaking temperature to 650° C. is not more than 10° C./min.

The non-oriented electrical steel sheet used in the manufacture of the motor core according to the invention is characterized by containing at least one group selected from the following groups A-D in addition to the above chemical composition:

Group A: one or two selected from Mo and W in an amount of 0.0020 to 0.10 mass % in total,
Group B: one or two selected from Sn: 0.005 to 0.20 mass % and Sb: 0.005 to 0.20 mass %,
Group C: one or two selected from Ca and Mg in an amount of 0.001 to 0.010 mass % in total, and
Group D: one or more selected from Cu: 0.01 to 0.2 mass %, Ni: 0.05 to 1 mass % and Cr: 0.01 to 0.5 mass %.

Furthermore, the invention is a motor core comprised of a rotor core and a stator core manufactured from the same non-oriented electrical steel sheet having a chemical composition comprising C: not more than 0.0050 mass %, Si: 2.5 to 6.5 mass %, Mn: 0.05 to 2.0 mass %, P: not more than 0.2 mass %, S: not more than 0.005 mass %, Al: not more than 3 mass %, N: not more than 0.005 mass %, Ti: not more than 0.003 mass %, Nb: not more than 0.005 mass %, V: not more than 0.005 mass %, provided that Si, Al and Mn satisfy the following equation (1):

$$Si-2Al-Mn \geq 0 \tag{1}$$

and the residue being Fe and inevitable impurities,
characterized in that the rotor core has a yield stress of not less than 400 MPa and
the stator core has such properties that iron loss $W_{10/400}$ (W/kg) after the stress relief annealing satisfies the following equation (2):

$$W_{10/400} \geq 10+25t \tag{2}$$

in relation to a sheet thickness t (mm),
an average value $\lambda_{o-p}$ (bake) of magnetostriction in a rolling direction and magnetostriction in a direction perpendicular to the rolling direction at 400 Hz and 1.0 T after the stress relief annealing is not more than 5.0×10$^{-6}$, and
a ratio ($\lambda_{o-p}$ (bake)/$\lambda_{o-p}$ (green)) of the above average value $\lambda_{o-p}$ (bake) of magnetostriction after the stress relief annealing to an average value $\lambda_{o-p}$ (green) of magnetostriction in the rolling direction and magnetostriction in the direction perpendicular to the rolling direction at 400 Hz and 1.0 T before the stress relief annealing is less than 0.8.

The non-oriented electrical steel sheet used in the motor core according to the invention is characterized by containing at least one group selected from the following groups A-D in addition to the above chemical composition:

Group A: one or two selected from Mo and W in an amount of 0.0020-0.10 mass % in total,
Group B: one or two selected from Sn: 0.005 to 0.20 mass % and Sb: 0.005-0.20 mass %,
Group C: one or two selected from Ca and Mg in an amount of 0.001-0.010 mass % in total, and
Group D: one or more selected from Cu: 0.01 to 0.2 mass %, Ni: 0.05 to 1 mass % and Cr: 0.01 to 0.5 mass %.

Effect of the Invention

According to the invention, the rotor core required to have a high strength and the stator core required to have a high magnetic flux density and a low iron loss can be manufactured from the same raw steel sheet material, which contributes to improvement of the productivity of the motor core.

DESCRIPTION OF EMBODIMENTS

Figure 1:
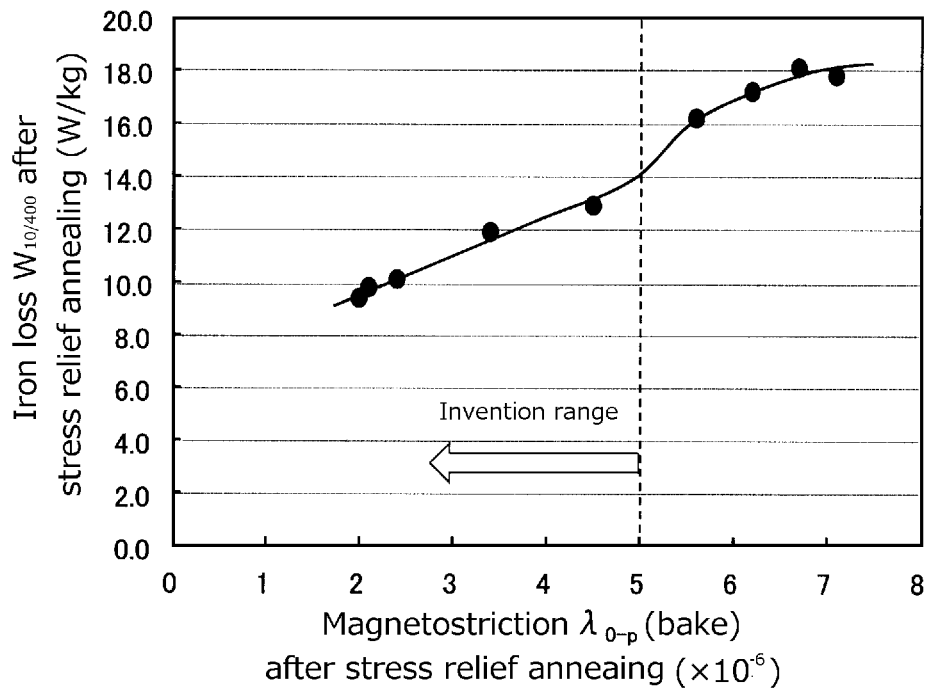
FIG. 1 is a graph showing a relation between magnetostriction $\lambda_{o\text{-}p}$ (bake) after stress relief annealing and iron loss $W_{10/400}$ after stress relief annealing.

An experiment based on the development of the invention will be described below.

No. 5 tensile test specimen is taken out from the steel sheet after the finish annealing in the rolling direction as a tensile direction and subjected to a tensile test according to JIS Z2241 to measure a yield stress.

Next, the samples of 280 mm×30 mm used in the magnetostriction measurement are subjected to a soaking treatment at 850° C. for 1 hour and then a heat treatment simulating stress relief annealing (SRA) of cooling from the soaking temperature to 650° C. at 8° C./min and further cooling to room temperature at 10° C./min. Thereafter, an average value $\lambda_{o\text{-}p}$ (bake) of magnetostriction in the rolling direction and magnetostriction in the direction perpendicular to the rolling direction at 400 Hz and 1.0 T after the stress relief annealing is again measured with the laser displacement gauge. An iron loss $W_{10/400}$ is also measured by an Epstein test method.

TABLE 1

| Steel symbol | Chemical composition (mass %) | | | | | | | | | | | |
|---|---|---|---|---|---|---|---|---|---|---|---|---|
| | C | Si | Mn | P | S | Al | N | Ti | Nb | V | O | Si—2Al—Mn |
| A | 0.0019 | 3.5 | 0.40 | 0.01 | 0.0014 | 0.90 | 0.0024 | 0.0013 | 0.0016 | 0.0011 | 0.0017 | 1.3 |
| B | 0.0018 | 3.8 | 0.30 | 0.01 | 0.0019 | 0.60 | 0.0024 | 0.0009 | 0.0014 | 0.0007 | 0.0014 | 2.3 |
| C | 0.0019 | 4.2 | 0.40 | 0.01 | 0.0014 | 0.30 | 0.0024 | 0.0013 | 0.0016 | 0.0011 | 0.0017 | 3.2 |
| D | 0.0019 | 2.6 | 0.80 | 0.01 | 0.0017 | 1.20 | 0.0021 | 0.0011 | 0.0012 | 0.0009 | 0.0019 | −0.6 |
| E | 0.0019 | 2.5 | 0.50 | 0.01 | 0.0017 | 1.60 | 0.0021 | 0.0011 | 0.0012 | 0.0009 | 0.0019 | −1.2 |
| F | 0.0024 | 2.7 | 1.20 | 0.01 | 0.0019 | 1.80 | 0.0029 | 0.0013 | 0.0016 | 0.0011 | 0.0024 | −2.1 |
| G | 0.0024 | 2.6 | 2.20 | 0.01 | 0.0019 | 0.95 | 0.0029 | 0.0013 | 0.0016 | 0.0011 | 0.0024 | −1.5 |
| H | 0.0024 | 3.1 | 0.80 | 0.01 | 0.0019 | 0.90 | 0.0029 | 0.0013 | 0.0016 | 0.0011 | 0.0024 | 0.5 |
| I | 0.0024 | 3.4 | 0.70 | 0.01 | 0.0019 | 0.60 | 0.0029 | 0.0013 | 0.0016 | 0.0011 | 0.0024 | 1.5 |

| Steel symbol | Properties after finish annealing | | Properties after stress relief annealing | | $\lambda_{o\text{-}p}$(bake)/ $\lambda_{o\text{-}p}$(green) | Remarks |
|---|---|---|---|---|---|---|
| | Yield stress (MPa) | Magnetostriction $\lambda_{o\text{-}p}$(green) (×10⁻⁶) | Iron loss $W_{10/400}$ (W/kg) | Magnetostriction $\lambda_{o\text{-}p}$(bake) (×10⁻⁶) | | |
| A | 550 | 4.5 | 10.1 | 2.4 | 0.53 | Invention Example |
| B | 580 | 3.8 | 9.8 | 2.1 | 0.55 | Invention Example |
| C | 620 | 3.3 | 9.4 | 2.0 | 0.61 | Invention Example |
| D | 460 | 7.1 | 16.2 | 5.6 | 0.79 | Comparative Example |
| E | 490 | 7.8 | 17.2 | 6.2 | 0.79 | Comparative Example |
| F | 520 | 8.9 | 17.8 | 7.1 | 0.80 | Comparative Example |
| G | 500 | 8.5 | 18.1 | 6.7 | 0.79 | Comparative Example |
| H | 500 | 5.9 | 12.9 | 4.5 | 0.76 | Invention Example |
| I | 500 | 4.5 | 11.9 | 3.4 | 0.76 | Invention Example |

In order to examine an influence of magnetostriction after stress relief annealing upon iron loss $W_{10/400}$ after stress relief annealing, a steel having a chemical composition shown in Table 1 is melted in a vacuum furnace and cast into a steel ingot, which is hot rolled to form a hot rolled sheet having a sheet thickness of 1.8 mm. The hot rolled sheet is subjected to a hot band annealing at 950° C. for 30 seconds, pickled and cold rolled to form a cold rolled sheet having a sheet thickness of 0.25 mm. Thereafter, the cold rolled sheet is subjected to a finish annealing in a non-oxidizing atmosphere of 20 vol % $H_2$-80 vol % $N_2$ at 800° C. for 10 seconds.

Then, a sample having a length of 280 mm and a width of 30 mm is taken out from the steel sheet after the finish annealing in L-direction and in C-direction to measure an average value $\lambda_{o\text{-}p}$ (green) of magnetostriction in a rolling direction and magnetostriction in a direction perpendicular to the rolling direction at 400 Hz and 1.0 T before stress relief annealing with a laser displacement gauge. Also, a JIS FIG. 1 shows a relation between magnetostriction $\lambda_{o\text{-}p}$ (bake) after stress relief annealing and iron loss $W_{10/400}$. As seen from this figure, an excellent iron loss property is obtained when the magnetostriction $\lambda_{o\text{-}p}$ (bake) after the stress relief annealing is not more than 5.0×10⁻⁶. In order to improve the iron loss property after the stress relief annealing, therefore, it is effective to reduce the magnetostriction $\lambda_{o\text{-}p}$ (bake). This is considered due to the fact that as the magnetostriction is increased, magnetoelastic energy is increased and hence hysteresis loss is deteriorated.

In order to further reduce the iron loss after the stress relief annealing based on the above result, a steel containing C: 0.0023 mass %, Si: 3.45 mass %, Mn: 0.51 mass %, P: 0.01 mass %, S: 0.0016 mass %, Al: 0.8 mass %, N: 0.0018 mass %, O: 0.0023 mass %, Ti: 0.0014 mass %, Nb: 0.0006 mass % and V: 0.0015 mass % is melted in a vacuum furnace and cast to obtain a steel ingot, which is hot rolled to form a hot rolled sheet having a sheet thickness of 2.0 mm. The hot rolled sheet is subjected to a hot band annealing at 930°

C. for 30 seconds, pickled and cold rolled to form a cold rolled sheet having a sheet thickness of 0.20 mm. The cold rolled sheet is subjected to a finish annealing in a non-oxidizing atmosphere of 20 vol % $H_2$-80 vol % $N_2$ at 850° C. for 10 seconds.

Then, a sample having a length of 280 mm and a width of 30 mm is taken out from the steel sheet after the finish annealing in L-direction and in C-direction to measure an average value $\lambda_{o-p}$ (green) of magnetostriction in a rolling direction and magnetostriction in a direction perpendicular to the rolling direction at 400 Hz and 1.0 T before stress relief annealing with a laser displacement gauge, which is $6.25 \times 10^{-6}$. Also, a JIS No. 5 tensile test specimen is taken out from the steel sheet after the finish annealing and subjected to a tensile test to obtain a yield stress of 520 MPa.

Next, the samples after the magnetostriction measurement are subjected to a stress relief annealing at 825° C. for 1 hour, and thereafter an iron loss $W_{10/400}$ after the stress relief annealing is measured. As a result, large scattering is caused in the iron loss. As the reason thereof is investigated, it is confirmed that the cooling rate from a soaking temperature in the stress relief annealing is non-uniform.

In order to investigate an influence of the cooling rate from the soaking temperature in the stress relief annealing upon the magnetostriction, the stress relief annealing is performed by varying the cooling rate from the stress relief annealing temperature (825° C.) to 650° C. within the range of 1° C./min to 30° C./min, and thereafter a magnetostriction $\lambda_{o-p}$ (bake) after stress relief annealing is measured to determine a ratio ($\lambda_{o-p}$ (bake)/$\lambda_{o-p}$ (green)) of magnetostriction before and after the stress relief annealing.

Figure 2:
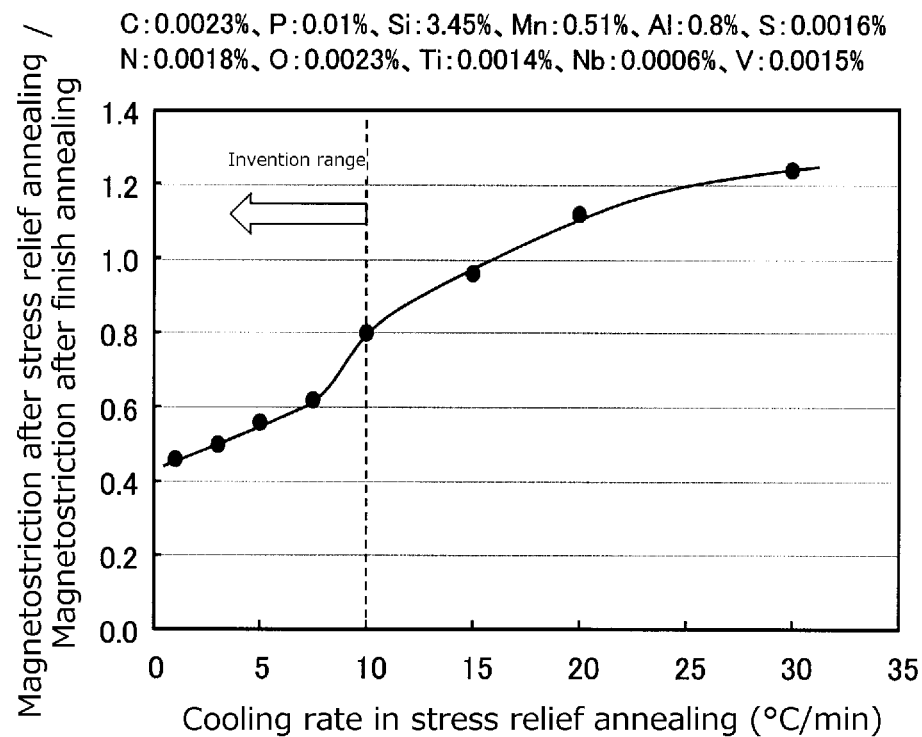
FIG. 2 is a graph showing a relation between a cooling rate from a soaking temperature in stress relief annealing and a ratio ($\lambda_{0\text{-}p}$ (bake)/$\lambda_{o\text{-}p}$ (green)) of magnetostriction before and after stress relief annealing.

FIG. 2 shows a relation between the cooling rate in the stress relief annealing and the ratio of magnetostriction before and after the stress relief annealing. It can be seen from this figure that when the cooling rate exceeds 10° C./min, the magnetostriction $\lambda_{o-p}$ (bake) after stress relief annealing becomes larger and the ratio of magnetostriction before and after the stress relief annealing becomes higher, which is considered to cause the scattering in the iron loss. Also, it can be seen from FIG. 2 that the cooling rate is preferably not more than 10° C./min, more preferably not more than 5° C./min to decrease the magnetostriction ratio, or to reduce the iron loss after the stress relief annealing.

Although a mechanism that the cooling rate in the stress relief annealing affects the magnetostriction, or the iron loss property is not elucidated sufficiently, it is considered that when the cooling rate in the stress relief annealing exceeds 10° C./min, cooling strain is introduced into the steel sheet to increase the magnetostriction after the stress relief annealing through a change of a magnetic domain structure and hence the effect by stress relief annealing is not recognized.

There will be described the non-oriented electrical steel sheet according the invention below.

In the non-oriented electrical steel sheet according to the invention, it is necessary that core materials for a rotor core and a stator core can be simultaneously taken out from the same raw steel sheet material. As previously mentioned, the rotor core is required to be excellent in the magnetic properties and also high in the strength, while the stator core is required to be excellent in the magnetic properties after the stress relief annealing.

Therefore, the non-oriented electrical steel sheet according to the invention is necessary to have the following properties.

Yield stress after finish annealing (before stress relief annealing): not less than 400 MPa The rotor core is usually formed by working a steel sheet after finish annealing into a core form by punching or the like, laminating and then clamping (fixing) through welding, caulking or the like, so that no stress relief annealing is performed. Therefore, the steel sheet after the finish annealing is required to have a high strength for use in the rotor core. In the invention, therefore, the yield stress of the steel sheet after the finish annealing is defined to be not less than 400 MPa, desirably not less than 450 MPa. Here, the yield stress means an upper yield point when a JIS No. 5 tensile test specimen is subjected to a tensile test according to JIS Z2241.

Iron Loss $W_{10/400}$ after Stress Relief Annealing: Not More than 10+25t (t: Sheet Thickness (Mm))

A stator core is usually formed by working a steel sheet after finish annealing into a core form by punching or the like, laminating, clamping (fixing) through welding, caulking or the like and then subjecting to stress relief annealing. Therefore, the steel sheet is required to be excellent in the iron loss property after the stress relief annealing for use in the stator core. In the invention, therefore, iron loss $W_{10/400}$ (frequency: 400 Hz, magnetic flux density B: 1.0 T) is used as an indicator representing the iron loss after the stress relief annealing in accordance with driving/controlling conditions of a HEV driving motor. As the iron loss value is dependent on the sheet thickness, it is required to satisfy the following equation (2):

$$W_{10/400} \leq 10+25t \quad (2)$$

in relation to the sheet thickness (mm). It is because when the iron loss value does not satisfy the equation (2), heat generation of the stator core becomes higher, and hence the motor efficiency is considerably lowered.

$\lambda_{o-p}$ (Bake): Not More than $5.0 \times 10^{-6}$

As shown in FIG. 1, the iron loss $W_{10/400}$ after stress relief annealing is strongly interrelated to the magnetostriction $\lambda_{o-p}$ (bake) after stress relief annealing, so that the iron loss $W_{10/400}$ after stress relief annealing can be controlled to a low value by decreasing the magnetostriction $\lambda_{o-p}$ (bake) after stress relief annealing. In the invention, therefore, the magnetostriction $\lambda_{o-p}$ (bake) after stress relief annealing is restricted to not more than $5.0 \times 10^{-6}$ when the iron loss $W_{10/400}$ satisfies the equation (2) in FIG. 1. It is preferably not more than $4.5 \times 10^{-6}$. Moreover, the value of the magnetostriction $\lambda_{o-p}$ (bake) is an average value of magnetostriction measured in the rolling direction and the direction perpendicular to the rolling direction at 400 Hz and 1.0 T.

$\lambda_{o-p}$ (Bake)/$\lambda_{o-p}$ (Green): Less than 0.8

As previously mentioned, when the cooling rate from the soaking temperature to 650° C. in the stress relief annealing exceeds 10° C./min, the magnetostriction $\lambda_{o-p}$ (bake) after stress relief annealing becomes larger than the magnetostriction $\lambda_{o-p}$ (green) before stress relief annealing (after the finish annealing), and the iron loss $W_{10/400}$ increases. In the invention, therefore, the ratio ($\lambda_{o-p}$ (bake)/$\lambda_{o-p}$ (green)) of the magnetostriction $\lambda_{o-p}$ (bake) after stress relief annealing to the magnetostriction $\lambda_{o-p}$ (green) before stress relief annealing is necessary to be less than 0.8 to improve the iron loss property after the stress relief annealing. It is preferably not more than 0.7. Moreover, each of the magnetostriction $\lambda_{o-p}$ (bake) and magnetostriction $\lambda_{o-p}$ (green) is an average value of magnetostriction measured in the rolling direction and the direction perpendicular to the rolling direction at 400 Hz and 1.0 T.

There will be described the chemical composition of the non-oriented electrical steel sheet according to the invention below.

C: Not More than 0.0050 Mass %

C contained in a product sheet is a harmful element which forms a carbide to cause magnetic aging and deteriorate iron loss property. Therefore, the upper limit of C contained in the raw sheet material is restricted to 0.0050 mass %. It is preferably not more than 0.0040 mass %. The lower limit of C is not particularly defined, but is preferably about 0.0001 mass % from a viewpoint of suppressing decarburization cost in a refining process.

Si: 2.5 to 6.5 Mass %

Si has an effect of increasing a specific resistance of steel to reduce the iron loss and also has an effect of strengthening solid solution to increase the strength of steel, so that it is contained in an amount of not less than 2.5 mass %. On the other hand, when it exceeds 6.5 mass %, it is difficult to perform rolling, so that the upper limit thereof is 6.5 mass %. It is preferably within the range of 3.0 to 6.5 mass %.

Mn: 0.05 to 2.0 Mass %

Mn is an element useful for increasing the specific resistance and strength of steel like Si. It is also an element forming a sulfide to improve hot shortness, so that it is contained in an amount of not less than 0.05 mass %. On the other hand, when it exceeds 2.0 mass %, cracking of slab and the like are caused to deteriorate operability in steel-making, so that the upper limit thereof is 2.0 mass %. It preferably falls within the range of 0.1 to 1.5 mass %.

P: Not More than 0.2 Mass %

P is an element useful for adjusting strength (hardness) of steel. However, when it exceeds 0.2 mass %, it is difficult to perform rolling due to embrittlement of steel, so that the upper limit thereof is 0.2 mass %. The lower limit is not particularly defined, but is preferably about 0.001 mass % from a viewpoint of suppressing dephosphorization cost in the refining process. It preferably falls within the range of 0.01 to 0.1 mass %.

Al: Not More than 3 Mass %

Al is an element useful for increasing the specific resistance of steel to reduce the iron loss like Si. However, when it exceeds 3 mass %, it is difficult to perform rolling, so that the upper limit of Al is 3 mass %. It is preferably not more than 2 mass %.

When the Al content exceeds 0.01 mass % but is less than 0.1 mass %, fine AlN is precipitated to increase the iron loss. Therefore, Al is preferably not more than 0.01 mass % or not less than 0.1 mass %. Especially, as Al is decreased, texture is improved to increase the magnetic flux density, so that when the magnetic flux density is important, Al is preferably not more than 0.01 mass %. More preferably, it is not more than 0.003 mass %.

Each of S, N, Nb and V: Not More than 0.005 Mass %

S, N, Nb and V are elements which form finely divided precipitates to block grain growth in stress relief annealing and badly affect the iron loss property. In particular, when each of them exceeds 0.005 mass %, the bad influence becomes remarkable, so that each upper limit is restricted to 0.005 mass %. It is preferably not more than 0.003 mass %.

Ti: Not More than 0.003 Mass %

Ti is an element which similarly forms finely divided precipitates to block grain growth in stress relief annealing and badly affect the iron loss property. In particular, when it exceeds 0.003 mass %, the bad influence becomes remarkable, so that the upper limit is restricted to 0.003 mass %. It is preferably not more than 0.002 mass %.

$Si-2Al-Mn \geq 0$

In the non-oriented electrical steel sheet according to the invention, it is necessary that the above ingredients satisfy the predetermined compositional range and, moreover, Si, Al and Mn contents (mass %) satisfy the following equation (1):

$$Si-2Al-Mn \geq 0 \qquad (1)$$

When the contents do not satisfy the equation (1), or the left-hand side of the equation (1) is less than 0, hysteresis loss after the finish annealing at 400 Hz and 1.0 T increases and also the magnetostriction $\lambda_{o-p}$ (green) increases. Moreover, the value of the left-hand side of the equation (1) is preferably not less than 0.3.

The non-oriented electrical steel sheet according to the invention may contain the following elements in addition to the above essential ingredients.

Mo and W: 0.0020 to 0.10 Mass % in Total

Mn and W are elements useful for suppressing surface defect (scab) in the non-oriented electrical steel sheet according to the invention. Since the steel sheet according to the invention is a high-alloy steel and a surface thereof is easily oxidized, a ratio of generating scab resulted from surface cracking is high. However, the above cracking can be suppressed by the minor addition of Mo and W which are elements increasing a high-temperature strength. This effect is not sufficient when the total amount of Mo and W is less than 0.0020 mass %, while when it exceeds 0.10 mass %, the effect is saturated and the alloying cost increases. Therefore, Mo and W are added, the total amount is preferably in the above range. More preferably, it falls within the range of 0.0050 to 0.050 mass %.

Each of Sn and Sb: 0.005 to 0.20 Mass %

Sn and Sb have an effect of improving recrystallization texture to improve the magnetic flux density and iron loss property. In order to obtain the above effect, the addition amount is necessary to be not less than 0.005 mass %. However, when the addition amount exceeds 0.20 mass %, the above effect is saturated. Therefore, when Sn and Sb are added, each addition amount is preferably within the range of 0.005 to 0.20 mass %. More preferably, it falls within the range of 0.01 to 0.1 mass %.

Ca and Mg: 0.001 to 0.010 Mass % in Total

Ca and Mg have an effect of forming stable sulfide or selenide to improve grain growth in stress relief annealing. In order to obtain such an effect, Ca and Mg are necessary to be added in a total amount of not less than 0.001 mass %, while when the addition exceeds 0.010 mass %, the iron loss rather increases. Therefore, when Ca and Mg are added, each addition amount is preferably within the above range. More preferably, it falls within the range of 0.003 to 0.008 mass %.

Cu: 0.01 to 0.2 Mass %

Cu has an effect of improving the texture to increase the magnetic flux density. In order to obtain such an effect, Cu is desirable to be contained in an amount of not less than 0.01 mass %. While when it exceeds 0.2 mass %, the above effect is saturated, so that the upper limit is 0.2 mass %. More preferably, the addition amount falls within a range of 0.05 to 0.15 mass %.

Ni: 0.05 to 1 Mass %

Ni has an effect of increasing strength and specific resistance of steel. In order to obtain such an effect, it is desirable to be contained in an amount of not less than 0.05 mass %. However, Ni is expensive and brings about the increase of the raw material cost, so that the upper limit is 1 mass %. More preferably, the addition amount is within the range of 0.1 to 0.5 mass %.

Cr: 0.01 to 0.5 Mass %

Cr has an effect of increasing specific resistance of steel to reduce the iron loss. In order to obtain such an effect, it is desirable to be contained in an amount of not less than 0.01 mass %. However, when it exceeds 0.5 mass %, the raw material cost is increased, so that the upper limit is 0.5 mass %. More preferably, the addition amount falls within the range of 0.1 to 0.4 mass %.

Next, the method for producing the non-oriented electrical steel sheet according to the invention will be described below.

At first, a steel having a chemical composition adapted to the invention is melted by a conventionally well-known refining process using a convertor, an electric furnace, a vacuum degassing device or the like and shaped into a steel slab by a continuous casting method or an ingot making-blooming method. The steel slab is hot rolled by a conventionally well-known method to form a hot rolled sheet.

The hot rolled sheet may be subjected to a hot band annealing, if necessary. In this case, a soaking temperature preferably falls within the range of 800 to 1100° C. When it is lower than 800° C., the effect of the hot band annealing is small and the effect of sufficiently improving the magnetic properties cannot be obtained, while when it exceeds 1100° C., inconvenience is caused in the production cost or there is a fear of promoting hot shortness (sheet breakage) in the cold rolling.

After the above hot rolling or hot band annealing, the hot rolled sheet is subjected to one cold rolling or two or more cold rollings interposing an intermediate annealing therebetween to form a cold rolled sheet having a final sheet thickness. In this case, the final cold rolling is preferably warm rolling conducted at not lower than 200° C., from a viewpoint of increasing the magnetic flux density.

Moreover, the final sheet thickness (product sheet thickness) is preferably within the range of 0.1 to 0.3 mm. When it is less than 0.1 mm, the productivity is decreased, while when it exceeds 0.3 mm, the effect of reducing the iron loss is small.

Thereafter, the cold rolled sheet having the final sheet thickness is subjected to a finish annealing, which is preferably a continuous annealing of soaking the sheet at a temperature of 700 to 1000° C. for 1 to 300 seconds. When the soaking temperature is lower than 700° C., recrystallization is not promoted sufficiently and hence good magnetic properties cannot be obtained. Moreover, the effect of correcting the shape in the continuous annealing cannot be obtained. While, when it exceeds 1000° C., the crystal grain size is coarsened and the strength is decreased. From a viewpoint of ensuring the strength after the finish annealing required in the rotor core, the finish annealing is desirably performed at a lower temperature for a shorter time as long as the shape correction can be conducted.

In order that an insulation property is ensured in the lamination, it is preferable to coat an insulating film on a surface of the steel sheet after the finish annealing. The insulating film is desirably an organic film containing a resin in order to ensure the good punchability or a semi-organic film or an inorganic film when the weldability is important.

Moreover, the stator core is usually manufactured by working a steel sheet after finish annealing into a core form through punching or the like, laminating and fixing core materials thereof and then subjecting to a stress relief annealing. In this case, the stress relief annealing is preferably performed in an inert gas atmosphere at 780 to 950° C. for 0.1 to 10 hours. When the stress relief annealing temperature is lower than 780° C., the effect of improving the iron loss property by stress relief annealing is small, while when it exceeds 950° C., it is difficult to ensure the insulation property between laminated steel sheets. As previously mentioned, in order to reduce magnetostriction after the stress relief annealing, it is important that a cooling rate from the soaking temperature in the stress relief annealing to 650° C. is not more than 10° C./min.

EXAMPLES

A steel slab having each chemical composition shown in Table 2 is heated at a temperature of 1100° C. for 30 minutes and hot rolled to form a hot rolled sheet having a sheet thickness of 1.8 mm. The hot rolled sheet is subjected to a hot band annealing at 980° C. for 30 seconds and cold rolled once to form a cold rolled sheet having a sheet thickness shown in Table 3. The cold rolled sheet is subjected to a finish annealing by soaking at a temperature shown in Table 3 for 10 second.

Then, a L-direction sample of L: 280 mm×C: 30 mm and a C-direction sample of C: 280 mm×L: 30 mm are cut out from the steel sheet after the finish annealing to measure magnetostriction $\lambda_{o-p}$ (green) of the steel sheet after the finish annealing with a laser displacement gauge. Moreover, JIS No. 5 tensile test specimen is taken out from the product sheet after the finish annealing and subjected to a tensile test to measure a yield stress.

The L-direction sample and C-direction sample of 280 mm×30 mm used in the magnetostriction measurement after the finish annealing are further subjected to a stress relief annealing by soaking at a temperature shown in Table 3 for 1 hour. In this case, a cooling rate from the soaking temperature in the stress relief annealing to 650° C. is varied as shown in Table 3.

With respect to the samples after the stress relief annealing, magnetostriction $\lambda_{o-p}$ (bake) is measured with the laser displacement gauge, from which a ratio ($\lambda_{o-p}$ (bake)/$\lambda_{o-p}$ (green)) of magnetostriction before and after the stress relief annealing is determined, while an iron loss $W_{10/400}$ after the stress relief annealing is measured by an Epstein test.

The measured results are also shown in Table 3. As seen from this table, non-oriented electrical steel sheets and motor cores manufactured by using raw steel materials adapted to the invention under conditions adapted to the invention have excellent mechanical properties and magnetic properties. The steel symbol E, G, L and Q shown in Table 2 are excluded from target for evaluation because they are impossible to be cold rolled.

TABLE 2

| Steel symbol | Chemical composition (mass %) | | | | | | | | | | |
|---|---|---|---|---|---|---|---|---|---|---|---|
| | C | Si | Mn | P | S | Al | N | Ti | Nb | V | O |
| A | 0.0019 | 3.5 | 0.40 | 0.01 | 0.0014 | 0.90 | 0.0024 | 0.0013 | 0.0016 | 0.0011 | 0.0017 |
| B | 0.0018 | 3.7 | 0.30 | 0.01 | 0.0019 | 0.60 | 0.0024 | 0.0009 | 0.0014 | 0.0007 | 0.0014 |

TABLE 2-continued

| | | | | | | | | | | | |
|---|---|---|---|---|---|---|---|---|---|---|---|
| C | 0.0019 | 1.4 | 0.40 | 0.01 | 0.0014 | 0.80 | 0.0024 | 0.0013 | 0.0016 | 0.0011 | 0.0017 |
| D | 0.0019 | 4.5 | 0.50 | 0.01 | 0.0017 | 0.30 | 0.0021 | 0.0011 | 0.0012 | 0.0009 | 0.0019 |
| E | 0.0019 | 7.6 | 0.50 | 0.01 | 0.0017 | 0.30 | 0.0021 | 0.0011 | 0.0012 | 0.0009 | 0.0019 |
| F | 0.0024 | 3.4 | 1.20 | 0.01 | 0.0019 | 0.30 | 0.0029 | 0.0013 | 0.0016 | 0.0011 | 0.0024 |
| G | 0.0024 | 3.4 | 2.50 | 0.01 | 0.0019 | 0.50 | 0.0029 | 0.0013 | 0.0016 | 0.0011 | 0.0024 |
| H | 0.0022 | 3.2 | 0.50 | 0.01 | 0.0019 | 0.001 | 0.0031 | 0.0012 | 0.0011 | 0.0008 | 0.0028 |
| I | 0.0022 | 3.2 | 0.50 | 0.01 | 0.0019 | 0.001 | 0.0031 | 0.0012 | 0.0011 | 0.0008 | 0.0028 |
| J | 0.0022 | 3.2 | 0.50 | 0.01 | 0.0019 | 0.001 | 0.0031 | 0.0012 | 0.0008 | 0.0008 | 0.0028 |
| K | 0.0022 | 3.2 | 0.50 | 0.08 | 0.0019 | 0.001 | 0.0031 | 0.0004 | 0.0011 | 0.0008 | 0.0028 |
| L | 0.0022 | 3.2 | 0.50 | 0.24 | 0.0019 | 0.001 | 0.0024 | 0.0012 | 0.0011 | 0.0008 | 0.0023 |
| M | 0.0022 | 3.2 | 0.50 | 0.01 | 0.0019 | 0.001 | 0.0031 | 0.0012 | 0.0011 | 0.0008 | 0.0028 |
| N | 0.0022 | 3.0 | 0.50 | 0.01 | 0.0019 | 0.001 | 0.0021 | 0.0008 | 0.0006 | 0.0008 | 0.0018 |
| O | 0.0019 | 3.3 | 0.20 | 0.01 | 0.0014 | 1.40 | 0.0024 | 0.0013 | 0.0016 | 0.0011 | 0.0017 |
| P | 0.0019 | 3.4 | 0.20 | 0.01 | 0.0014 | 1.50 | 0.0024 | 0.0013 | 0.0016 | 0.0011 | 0.0017 |
| Q | 0.0019 | 2.8 | 0.40 | 0.01 | 0.0014 | 3.60 | 0.0024 | 0.0013 | 0.0016 | 0.0011 | 0.0017 |
| R | 0.0022 | 3.4 | 0.50 | 0.01 | 0.0019 | 0.001 | 0.0059 | 0.0012 | 0.0011 | 0.0008 | 0.0028 |
| S | 0.0022 | 3.4 | 0.50 | 0.01 | 0.0019 | 0.001 | 0.0018 | 0.0012 | 0.0011 | 0.0008 | 0.0064 |
| T | 0.0022 | 3.4 | 0.50 | 0.01 | 0.0019 | 0.001 | 0.0018 | 0.0045 | 0.0011 | 0.0008 | 0.0021 |
| U | 0.0022 | 3.4 | 0.50 | 0.01 | 0.0019 | 0.001 | 0.0018 | 0.0012 | 0.0057 | 0.0008 | 0.0023 |
| V | 0.0022 | 3.4 | 0.50 | 0.01 | 0.0019 | 0.001 | 0.0018 | 0.0012 | 0.0014 | 0.0062 | 0.0023 |
| W | 0.0024 | 3.6 | 0.60 | 0.01 | 0.0018 | 0.65 | 0.0022 | 0.0011 | 0.0011 | 0.0008 | 0.0025 |
| X | 0.0019 | 3.4 | 0.60 | 0.01 | 0.0021 | 0.65 | 0.0024 | 0.0010 | 0.0010 | 0.0007 | 0.0024 |
| Y | 0.0027 | 3.7 | 0.50 | 0.01 | 0.0017 | 0.65 | 0.0023 | 0.0009 | 0.0009 | 0.0014 | 0.0021 |
| Z | 0.0015 | 3.5 | 0.40 | 0.01 | 0.0018 | 0.65 | 0.0021 | 0.0012 | 0.0013 | 0.0012 | 0.0024 |
| AA | 0.0024 | 3.4 | 0.20 | 0.01 | 0.0014 | 0.90 | 0.0024 | 0.0013 | 0.0016 | 0.0011 | 0.0017 |
| AB | 0.0028 | 3.1 | 0.30 | 0.01 | 0.0019 | 1.00 | 0.0027 | 0.0015 | 0.0009 | 0.0009 | 0.0024 |
| AC | 0.0024 | 3.2 | 0.50 | 0.01 | 0.0018 | 0.90 | 0.0018 | 0.0014 | 0.0011 | 0.0010 | 0.0026 |
| AD | 0.0019 | 3.5 | 0.50 | 0.01 | 0.0016 | 0.80 | 0.0019 | 0.0013 | 0.0011 | 0.0009 | 0.0019 |
| AE | 0.0023 | 3.6 | 0.50 | 0.01 | 0.0016 | 0.50 | 0.0019 | 0.0013 | 0.0011 | 0.0009 | 0.0019 |
| AF | 0.0021 | 3.4 | 0.50 | 0.01 | 0.0016 | 0.60 | 0.0019 | 0.0013 | 0.0011 | 0.0009 | 0.0019 |
| AG | 0.0029 | 3.8 | 0.20 | 0.01 | 0.0022 | 0.40 | 0.0021 | 0.0011 | 0.0011 | 0.0010 | 0.0029 |
| AH | 0.0024 | 3.5 | 0.30 | 0.01 | 0.0015 | 0.70 | 0.0024 | 0.0015 | 0.0008 | 0.0012 | 0.0021 |
| AI | 0.0024 | 3.4 | 0.60 | 0.01 | 0.0015 | 0.70 | 0.0024 | 0.0009 | 0.0008 | 0.0012 | 0.0021 |
| AJ | 0.0024 | 3.6 | 0.50 | 0.01 | 0.0018 | 0.80 | 0.0023 | 0.0011 | 0.0007 | 0.0011 | 0.0028 |

| | Chemical composition (mass %) | | | | | | |
|---|---|---|---|---|---|---|---|
| Steel symbol | W | Mo | Sn | Sb | Ca, Mg, Cu, Ni, Cr | Si—2Al—Mn | Remarks |
| A | — | — | 0.001 | 0.001 | — | 1.3 | Invention steel |
| B | — | — | 0.040 | 0.001 | — | 2.2 | Invention steel |
| C | — | — | 0.001 | 0.001 | — | −0.6 | Comparative steel |
| D | — | — | 0.001 | 0.001 | — | 3.4 | Invention steel |
| E | — | — | 0.001 | 0.001 | — | 6.5 | Comparative steel |
| F | — | — | 0.001 | 0.001 | — | 1.6 | Invention steel |
| G | — | — | 0.001 | 0.001 | — | −0.1 | Comparative steel |
| H | — | — | 0.001 | 0.001 | — | 2.7 | Invention steel |
| I | — | — | 0.100 | 0.001 | — | 2.7 | Invention steel |
| J | — | — | 0.001 | 0.050 | — | 2.7 | Invention steel |
| K | — | — | 0.001 | 0.001 | — | 2.7 | Invention steel |
| L | — | — | 0.001 | 0.001 | — | 2.7 | Comparative steel |
| M | — | — | 0.001 | 0.001 | Ca: 0.003 | 2.7 | Invention steel |
| N | — | — | 0.001 | 0.001 | Mg: 0.002 | 2.5 | Invention steel |
| O | — | — | 0.001 | 0.001 | — | 0.3 | Invention steel |
| P | — | — | 0.001 | 0.001 | — | 0.2 | Invention steel |
| Q | — | — | 0.001 | 0.001 | — | −4.8 | Comparative steel |
| R | — | — | 0.001 | 0.001 | — | 2.9 | Comparative steel |
| S | — | — | 0.001 | 0.001 | — | 2.9 | Comparative steel |
| T | — | — | 0.001 | 0.001 | — | 2.9 | Comparative steel |
| U | — | — | 0.001 | 0.001 | — | 2.9 | Comparative steel |
| V | — | — | 0.001 | 0.001 | — | 2.9 | Comparative steel |
| W | 0.0027 | — | 0.001 | 0.001 | — | 1.7 | Invention steel |
| X | 0.0058 | — | 0.001 | 0.001 | — | 1.5 | Invention steel |
| Y | — | 0.0035 | 0.001 | 0.001 | — | 1.9 | Invention steel |
| Z | 0.0049 | 0.0028 | 0.001 | 0.001 | — | 1.8 | Invention steel |
| AA | — | — | 0.001 | 0.001 | Cr: 0.05 | 1.4 | Invention steel |
| AB | — | — | 0.001 | 0.001 | Cr: 0.20 | 0.8 | Invention steel |
| AC | — | — | 0.001 | 0.001 | Cr: 0.40 | 0.9 | Invention steel |
| AD | — | — | 0.001 | 0.001 | Cu: 0.03 | 1.4 | Invention steel |
| AE | — | — | 0.001 | 0.001 | Cu: 0.10 | 2.1 | Invention steel |
| AF | — | — | 0.001 | 0.001 | Cu: 0.15 | 1.7 | Invention steel |
| AG | — | — | 0.001 | 0.001 | Ni: 0.10 | 2.8 | Invention steel |
| AH | — | — | 0.001 | 0.001 | Ni: 0.50 | 1.8 | Invention steel |
| AI | — | — | 0.001 | 0.001 | Cr: 0.05, Cu: 0.05 | 1.4 | Invention steel |
| AJ | — | — | 0.001 | 0.001 | Cr: 0.05, Ni: 0.20 | 1.5 | Invention steel |

TABLE 3

| Steel number | Steel symbol | Sheet thickness t (mm) | Finish annealing temperature (° C.) | Stress relief annealing conditions Annealing temperature (° C.) | Time (hr) | Cooling rate to 650° C. (° C./s) | Yield stress (MPa) | Properties after finish annealing Magnetostriction $\lambda_{0\text{-}p}$(green) ($\times 10^{-6}$) |
|---|---|---|---|---|---|---|---|---|
| 1 | A | 0.25 | 820 | 800 | 1.0 | 15 | 525 | 4.8 |
| 2 | A | 0.25 | 820 | 800 | 1.0 | 4 | 525 | 4.8 |
| 3 | A | 0.15 | 800 | 825 | 1.0 | 2 | 540 | 4.6 |
| 4 | A | 0.30 | 800 | 825 | 1.0 | 5 | 540 | 4.7 |
| 5 | B | 0.20 | 750 | 850 | 1.0 | 1 | 550 | 4.2 |
| 6 | B | 0.25 | 770 | 850 | 1.0 | 2 | 550 | 4.1 |
| 7 | C | 0.25 | 880 | 775 | 1.0 | 5 | 350 | 5.2 |
| 8 | D | 0.20 | 830 | 825 | 1.0 | 2 | 570 | 3.9 |
| 9 | F | 0.25 | 780 | 850 | 1.0 | 3 | 550 | 5.2 |
| 10 | H | 0.20 | 770 | 830 | 1.0 | 4 | 470 | 4.5 |
| 11 | I | 0.20 | 770 | 830 | 1.0 | 4 | 470 | 4.3 |
| 12 | J | 0.20 | 770 | 830 | 1.0 | 4 | 470 | 4.2 |
| 13 | K | 0.20 | 770 | 830 | 1.0 | 4 | 475 | 4.2 |
| 14 | M | 0.20 | 770 | 830 | 1.0 | 4 | 470 | 4.3 |
| 15 | N | 0.20 | 770 | 780 | 1.0 | 4 | 470 | 4.3 |
| 16 | O | 0.25 | 820 | 830 | 1.0 | 3 | 500 | 5.3 |
| 17 | P | 0.25 | 800 | 850 | 1.0 | 3 | 520 | 5.4 |
| 18 | R | 0.30 | 790 | 850 | 1.0 | 6 | 500 | 4.6 |
| 19 | S | 0.30 | 790 | 850 | 1.0 | 6 | 500 | 4.6 |
| 20 | T | 0.30 | 790 | 850 | 1.0 | 6 | 500 | 4.6 |
| 21 | U | 0.30 | 790 | 850 | 1.0 | 6 | 500 | 4.6 |
| 22 | V | 0.30 | 790 | 850 | 1.0 | 6 | 500 | 4.6 |
| 23 | W | 0.25 | 800 | 800 | 1.0 | 4 | 520 | 4.5 |
| 24 | X | 0.25 | 800 | 800 | 1.0 | 4 | 510 | 4.4 |
| 25 | Y | 0.25 | 800 | 800 | 1.0 | 4 | 550 | 4.2 |
| 26 | Z | 0.25 | 800 | 800 | 1.0 | 4 | 535 | 4.5 |
| 27 | AA | 0.25 | 810 | 825 | 1.5 | 5 | 540 | 5.1 |
| 28 | AB | 0.25 | 810 | 825 | 1.5 | 5 | 530 | 5.5 |
| 29 | AC | 0.25 | 810 | 825 | 1.5 | 5 | 535 | 5.4 |
| 30 | AD | 0.25 | 810 | 825 | 1.5 | 5 | 560 | 5.1 |
| 31 | AE | 0.25 | 810 | 825 | 1.5 | 5 | 555 | 5.2 |
| 32 | AF | 0.25 | 810 | 825 | 1.5 | 5 | 530 | 5.3 |
| 33 | AG | 0.25 | 810 | 825 | 1.5 | 5 | 560 | 5.2 |
| 34 | AH | 0.25 | 810 | 825 | 1.5 | 5 | 545 | 5.1 |
| 35 | AI | 0.25 | 810 | 825 | 1.5 | 5 | 540 | 5.2 |
| 36 | AJ | 0.25 | 810 | 825 | 1.5 | 5 | 565 | 5.1 |

| Steel number | Properties after stress relief annealing Iron loss $W_{10/400}$ (W/kg) | 10 + 25t | Magnetostriction $\lambda_{0\text{-}p}$(bake) ($\times 10^{-6}$) | $\lambda_{0\text{-}p}$(bake)/ $\lambda_{0\text{-}p}$(green) | Remarks |
|---|---|---|---|---|---|
| 1 | 15.8 | 13.8 | 5.1 | 1.06 | Comparative Example |
| 2 | 10.8 | 13.8 | 2.4 | 0.50 | Invention Example |
| 3 | 8.8 | 12.3 | 2.4 | 0.52 | Invention Example |
| 4 | 11.8 | 14.5 | 2.6 | 0.55 | Invention Example |
| 5 | 9.5 | 13.0 | 1.9 | 0.45 | Invention Example |
| 6 | 10.4 | 13.8 | 1.9 | 0.46 | Invention Example |
| 7 | 13.4 | 13.8 | 3.5 | 0.67 | Comparative Example |
| 8 | 9.5 | 13.0 | 1.8 | 0.46 | Invention Example |
| 9 | 9.8 | 13.8 | 3.5 | 0.67 | Invention Example |
| 10 | 12.1 | 13.0 | 2.4 | 0.53 | Invention Example |
| 11 | 12.0 | 13.0 | 2.3 | 0.53 | Invention Example |
| 12 | 11.9 | 13.0 | 2.2 | 0.52 | Invention Example |
| 13 | 11.9 | 13.0 | 2.2 | 0.52 | Invention Example |
| 14 | 11.8 | 13.0 | 2.3 | 0.53 | Invention Example |
| 15 | 11.9 | 13.0 | 2.3 | 0.53 | Invention Example |
| 16 | 10.7 | 13.8 | 2.5 | 0.47 | Invention Example |
| 17 | 10.4 | 13.8 | 2.6 | 0.48 | Invention Example |
| 18 | 19.2 | 14.5 | 2.8 | 0.61 | Comparative Example |
| 19 | 19.4 | 14.5 | 2.8 | 0.61 | Comparative Example |
| 20 | 18.2 | 14.5 | 2.8 | 0.61 | Comparative Example |
| 21 | 18.6 | 14.5 | 2.8 | 0.61 | Comparative Example |
| 22 | 18.9 | 14.5 | 2.8 | 0.61 | Comparative Example |
| 23 | 10.7 | 13.8 | 2.6 | 0.58 | Invention Example |
| 24 | 11.1 | 13.8 | 2.5 | 0.57 | Invention Example |
| 25 | 10.2 | 13.8 | 2.4 | 0.57 | Invention Example |
| 26 | 10.5 | 13.8 | 2.6 | 0.58 | Invention Example |
| 27 | 10.5 | 13.8 | 2.5 | 0.49 | Invention Example |
| 28 | 10.5 | 13.8 | 2.8 | 0.51 | Invention Example |

TABLE 3-continued

| | | | | | |
|---|---|---|---|---|---|
| 29 | 10.5 | 13.8 | 2.7 | 0.50 | Invention Example |
| 30 | 10.2 | 13.8 | 2.7 | 0.53 | Invention Example |
| 31 | 10.3 | 13.8 | 2.6 | 0.50 | Invention Example |
| 32 | 10.6 | 13.8 | 2.7 | 0.51 | Invention Example |
| 33 | 10.3 | 13.8 | 2.8 | 0.54 | Invention Example |
| 34 | 10.5 | 13.8 | 2.8 | 0.55 | Invention Example |
| 35 | 10.5 | 13.8 | 2.7 | 0.52 | Invention Example |
| 36 | 10.3 | 13.8 | 2.6 | 0.51 | Invention Example |

Steel symbols: E, G, L and Q are excluded from target for evaluation because they are impossible to be cold rolled.

The invention claimed is:

1. A method for producing a non-oriented electrical steel sheet, the method comprising subjecting a steel slab to hot rolling, cold rolling, finish annealing, and stress relief annealing, wherein:

the steel slab has a chemical composition comprising:
C: not more than 0.0050 mass %,
Si: 2.5 to 6.5 mass %,
Mn: 0.05 to 2.0 mass %,
P: not more than 0.2 mass %,
S: not more than 0.005 mass %,
Al: not more than 3 mass %,
N: not more than 0.005 mass %,
Ti: not more than 0.003 mass %,
Nb: not more than 0.005 mass %,
V: not more than 0.005 mass %, and
Fe and inevitable impurities, provided that Si, Al and Mn satisfy the following equation (1):

$$Si-2Al-Mn \geq 0 \quad (1),$$

the stress relief annealing is conducted such that a soaking temperature is 780 to 950° C. and a cooling rate from the soaking temperature to 650° C. is in the range of 1 to 10° C./min, and conditions of the finish annealing and stress relief annealing are adjusted such that:

a yield stress after the finish annealing is not less than 400 MPa, iron loss $W_{10/400}$ after the stress relief annealing, in units of W/kg, satisfies the following equation (2):

$$W_{10/400} \leq 10+25t \quad (2)$$

in relation to a sheet thickness t, in units of mm, an average value $\lambda_{o\text{-}p}$ (bake) of magnetostriction in a rolling direction and magnetostriction in a direction perpendicular to the rolling direction at 400 Hz and 1.0 T after the stress relief annealing is not more than $5.0 \times 10^{-6}$, and a ratio ($\lambda_{o\text{-}p}$ (bake)/$\lambda_{o\text{-}p}$ (green)) of the above average value $\lambda_{o\text{-}p}$ (bake) of magnetostriction after the stress relief annealing to an average value $\lambda_{o\text{-}p}$ (green) of magnetostriction in the rolling direction and magnetostriction in the direction perpendicular to the rolling direction at 400 Hz and 1.0 T before the stress relief annealing is less than 0.8.

2. The method for producing a non-oriented electrical steel sheet according to claim 1, wherein the chemical composition further comprises at least one group selected from the following groups A-D:

Group A: one or two selected from Mo and W in an amount of 0.0020 to 0.10 mass % in total,
Group B: one or two selected from Sn: 0.005-0.20 mass % and Sb: 0.005-0.20 mass %,
Group C: one or two selected from Ca and Mg in an amount of 0.001-0.010 mass % in total, and
Group D: one or more selected from Cu: 0.01-0.2 mass %, Ni: 0.05-1 mass % and Cr: 0.01-0.5 mass %.

3. A method for manufacturing a motor core, the method comprising:

producing the non-oriented electrical steel sheet according to claim 1; and
simultaneously taking out rotor core materials and stator core materials from a the non-oriented electrical steel sheet.

4. The method for manufacturing a motor core according to claim 3, wherein the non-oriented electrical steel sheet contains at least one group selected from the following groups A-D in addition to the above chemical composition:

Group A: one or two selected from Mo and W in an amount of 0.0020 to 0.10 mass % in total,
Group B: one or two selected from Sn: 0.005 to 0.20 mass % and Sb: 0.005 to 0.20 mass %,
Group C: one or two selected from Ca and Mg in an amount of 0.001 to 0.010 mass % in total, and
Group D: one or more selected from Cu: 0.01 to 0.2 mass %, Ni: 0.05 to 1 mass % and Cr: 0.01 to 0.5 mass %.

* * * * *